United States Patent [19]

Boothman et al.

[11] Patent Number: 4,544,982

[45] Date of Patent: Oct. 1, 1985

[54] ELECTRICAL EQUIPMENT PROTECTION APPARATUS AND METHOD

[75] Inventors: David R. Boothman, Ennismore; John C. Forde, Peterborough, both of Canada

[73] Assignee: General Electric Company, Salem, Va.

[21] Appl. No.: 487,771

[22] Filed: Apr. 25, 1983

[30] Foreign Application Priority Data

May 7, 1982 [CA] Canada ............................... 402459

[51] Int. Cl.[4] ............................................ H02H 7/085
[52] U.S. Cl. ......................................... 361/96; 361/31; 361/76; 361/103
[58] Field of Search ................. 361/96, 97, 93, 94, 361/95, 86, 76, 77, 31, 33, 30, 24; 307/127; 324/86; 364/480, 483, 492

[56] References Cited

U.S. PATENT DOCUMENTS 4,291,355  9/1981  Dinger ........................... 361/96 X
4,381,531  4/1983  Eisenhauer ..................... 361/93 X

FOREIGN PATENT DOCUMENTS 962332    2/1975  Canada .......................... 324/17
983094    2/1976  Canada .......................... 318/50
2047995  12/1980  United Kingdom ............. 361/96

OTHER PUBLICATIONS

IEEE Transactions on Power Apparatus and Systems, vol. PAS-99, No. 1, Jan./Feb. 1980; "Digital Programmable Time-Parameter Relay Offers Versatility and Accuracy"; by Schweitzer, et al.; pp. 152–157.

Primary Examiner—Patrick R. Salce
Attorney, Agent, or Firm—Arnold E. Renner

[57] ABSTRACT

A method of and apparatus for protecting three phase electrical equipment where a signal is derived for each phase representing current in each phase, and the three signals combined to form an analog composite signal. The analog composite signal is converted to digital form. One of the analog signals is used to relate the values of the digital signals to respective phases. The largest value is used to determine heating in the equipent and from the heating the temperature of the equipment is derived. The temperature is compared to critical temperature levels and when a critical level is exceeded, the supply of power to the equipment is interrupted. The digital signals representing the current peaks in each phase are used to determine phase loss and phase unbalance, and the power supply is interrupted when there is a phase loss or when the unbalance exceeds a predetermined critical level.

1 Claim, 6 Drawing Figures

Microfiche Appendix Included
(1 Microfiche, 67 Pages)

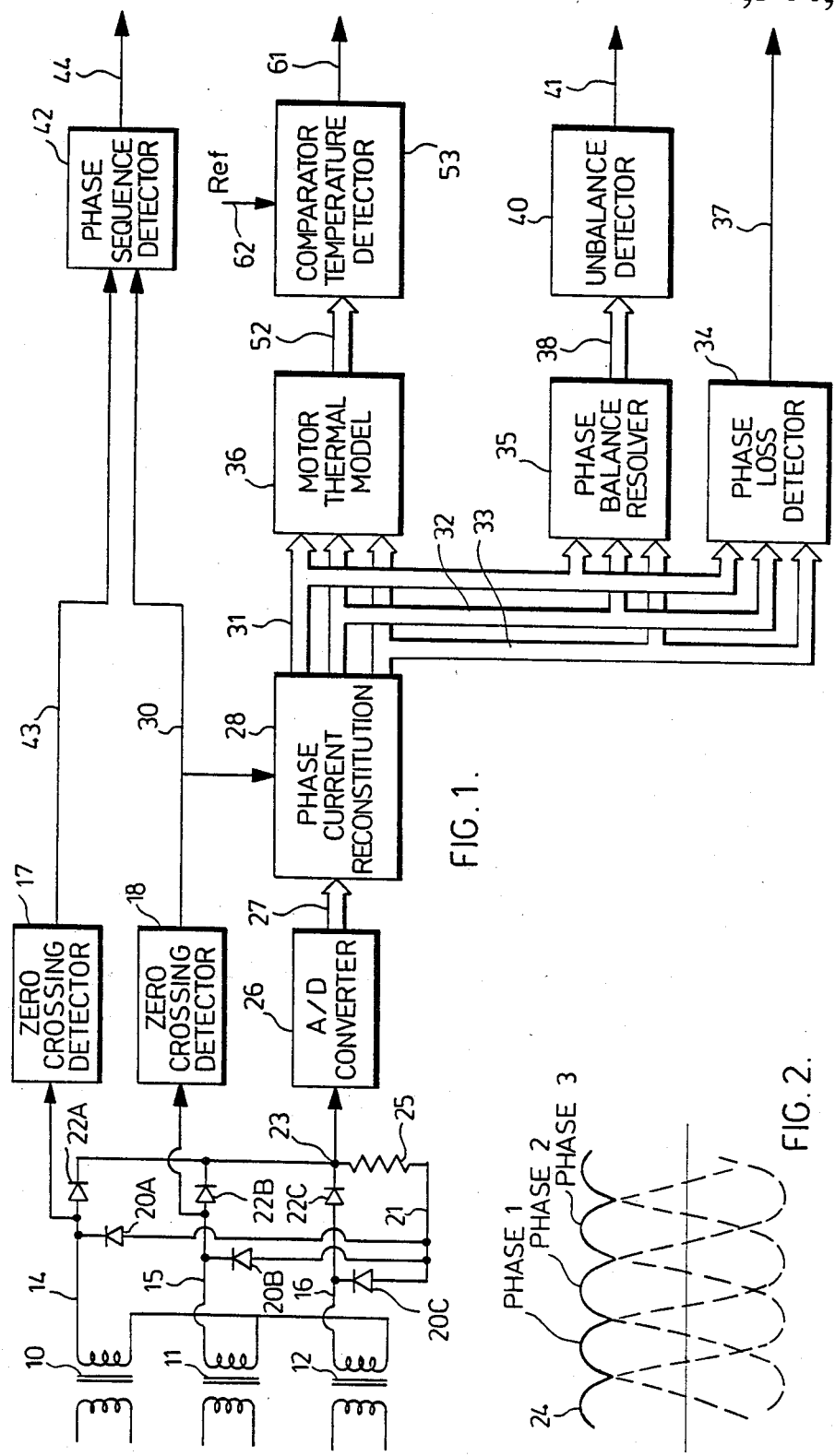

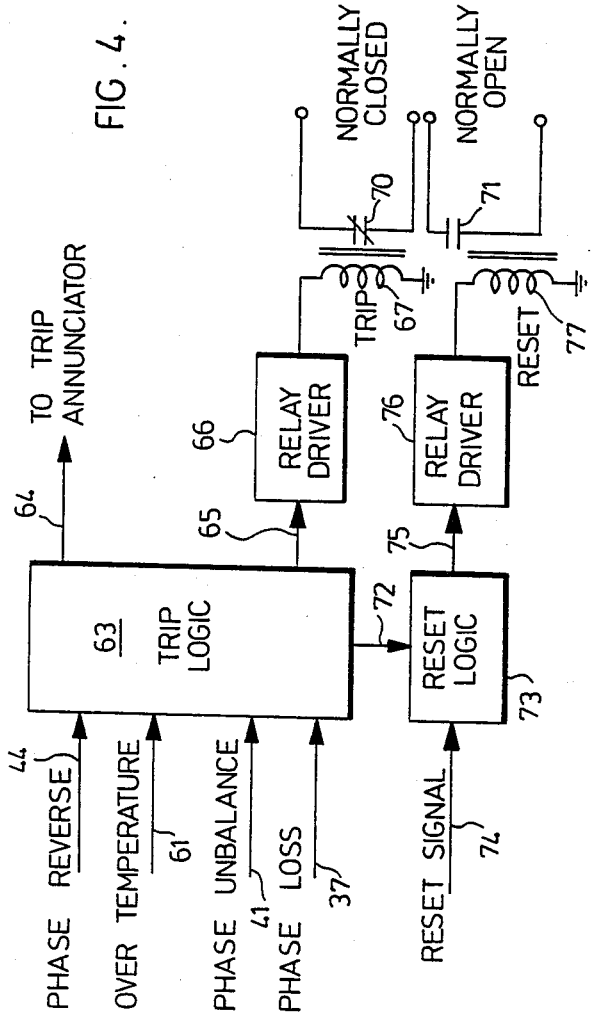
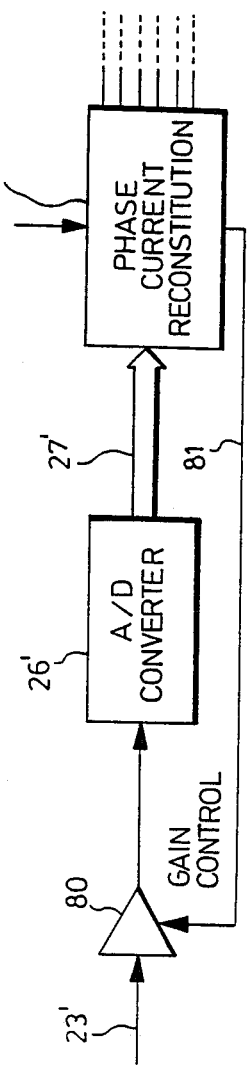

ELECTRICAL EQUIPMENT PROTECTION APPARATUS AND METHOD

REFERENCED MATERIAL

Reference is made to a microfiche appendix which sets forth a computer program listing including that which is applicable to the present invention. Included is one (1) microfiche containing a total of 67 frames.

BACKGROUND OF THE INVENTION

This invention relates to the protection of electrical apparatus and in particular it relates to a method and apparatus for the protection of polyphase apparatus such as electric motors and transformers.

Protection schemes as first developed were analog in nature and preferably included a separate protection for each phase. These schemes generally provided protection in one or more of the following areas: (a) overload, (b) phase unbalance, (c) phase loss, and (d) phase reversal.

Subsequently, protection schemes were designed to operate in digital form and in general followed the analog design. In other words, there was a digital arrangement for each of the three phases including for each phase an analog-to-digital converter, a memory, and associated circuitry. While the protection provided was suitable, the cost for smaller sizes of equipments was disproportionately high.

SUMMARY OF THE INVENTION

The present invention provides a simpler and less expensive form of electrical equipment protection which does not require, for each phase, an analog-to-digital conversion, a memory and associated circuitry. The apparatus of the invention does this by using a composite waveform. That is, it forms a composite analog waveform from waveforms representing the current in each phase of a multiphase or polyphase system. It converts this composite waveform into digital form requiring only one analog-to-digital conversion. The composite digital representation is checked for peaks or other critical quantity and the values stored. The highest value is selected and evaluated for heating. From this evaluation an overload signal is derived. The apparatus can identify the phase which had the highest peak, or in fact any phase, so specific phase information can be derived. A second input is required to identify the particular phase, but the second input need only be sensitive to polarity to detect zero crossing of a reference phase. Phase balance can be obtained from the stored digital value for each peak. By deriving a third signal which is a second polarity sensitive input (no analog-to-digital conversion is required) to monitor zero crossing, the phase sequence can be determined for three phases. Thus, one composite waveform provides the digital data and two analog phase signal zero detectors determine two of the three phases to give the phase sequence. Any value for overload, short circuit, or ground fault that is identifiable with a particular phase can be identified with that phase. Phase unbalance can be associated with the phases.

It is known, for example, in Canadian Pat. No. 983,094—Boothman et al., issued Feb. 3, 1976 to Canadian General Electric Company Limited, to use current sensors to derive a signal representing the current in each phase of an electrical supply to a motor, and to combine these signals to develop a composite waveform. The composite waveform representing current is then used to develop a signal representing temperature. When the temperature signal exceeds a predetermined limit, the supply to the motor is interrupted. The protective arrangement in this patent makes use of the composite waveform. It uses substantially the average value for the composite waveform and, consequently, does not represent the worst case. It does not subsequently separate any signals into phase related signals and consequently cannot identify a phase related problem with a particular phase. It does not operate digitally.

The use of composite waveforms representing the various phase currents (but without identifying the phases) is not new. Another prior patent showing the use of such a composite waveform is Canadian Pat. No. 962,332—Boothman et al., issued Feb. 4, 1975 to Canadian General Electric Company Limited.

It is, therefore, a feature of the present invention to provide an improved method and apparatus for the protection of electrical equipment.

It is another feature of the invention to provide apparatus for the protection of a poly-phase motor which appartus requires only one digital to analog converter and provides phase information for phase-related problems.

It is yet another feature of the invention to provide a method for combining a plurality of phase current analog signals to form a composite wave, convert the wave to a digital signal representing peak current values, and use the values to determine unacceptable conditions of operation.

Accordingly, there is provided apparatus for protecting poly-phase electrical equipment comprising means for deriving from an electric circuit providing power to said electrical equipment an analog signal for each phase representing current in the respective phase, means for forming, from said analog signals, a composite analog signal, an analog-to-digital converter means for receiving said composite analog signal and providing a digital signal representing said composite analog signal, means for deriving from one of said analog signals a timing signal representing when the current in a respective phase passes through a reference level, a phase current reconstitution means for receiving said digital signal representing said composite analog signal and said timing signal and providing, for each phase, digital signals representing the current in a respective phase and means selecting the digital signals representing the largest of said currents and responsive to an undesired current condition interrupting the supply of power to said electrical equipment.

There is also provided a method of protecting polyphase electrical equipment comprising deriving from the electrical supply to said equipment an analog phase signal for each phase representing the current in the respective phase, combining said analog phase signals to form a composite analog signal, converting said composite analog signal to a digital signal, detecting the value of said digital signal representing the current in the phase with the highest current, determining from said value an equivalent temperature for said apparatus, and interrupting the electrical supply to said apparatus if said equivalent temperature exceeds a predetermined level.

BRIEF DESCRIPTION OF THE DRAWING

While the present invention is defined by the claims appended to and forming a part of this specification, a better understanding thereof can be had by reference to the following description taken in conjunction with the accompanying drawing in which:

FIG. 1 is a simplified block schematic diagram of a form of the invention;

FIG. 2 is a waveform diagram showing a composite waveform such as is used in the invention;

FIG. 4 is a simplified block schematic diagram of trip circuitry;

FIG. 5 is a simplified block schematic diagram of an alternate converter arrangement; and, FIG. 6 is a block diagram illustrating the present invention as implemented using a data processor.

DETAILED DESCRIPTION

Figure 3:
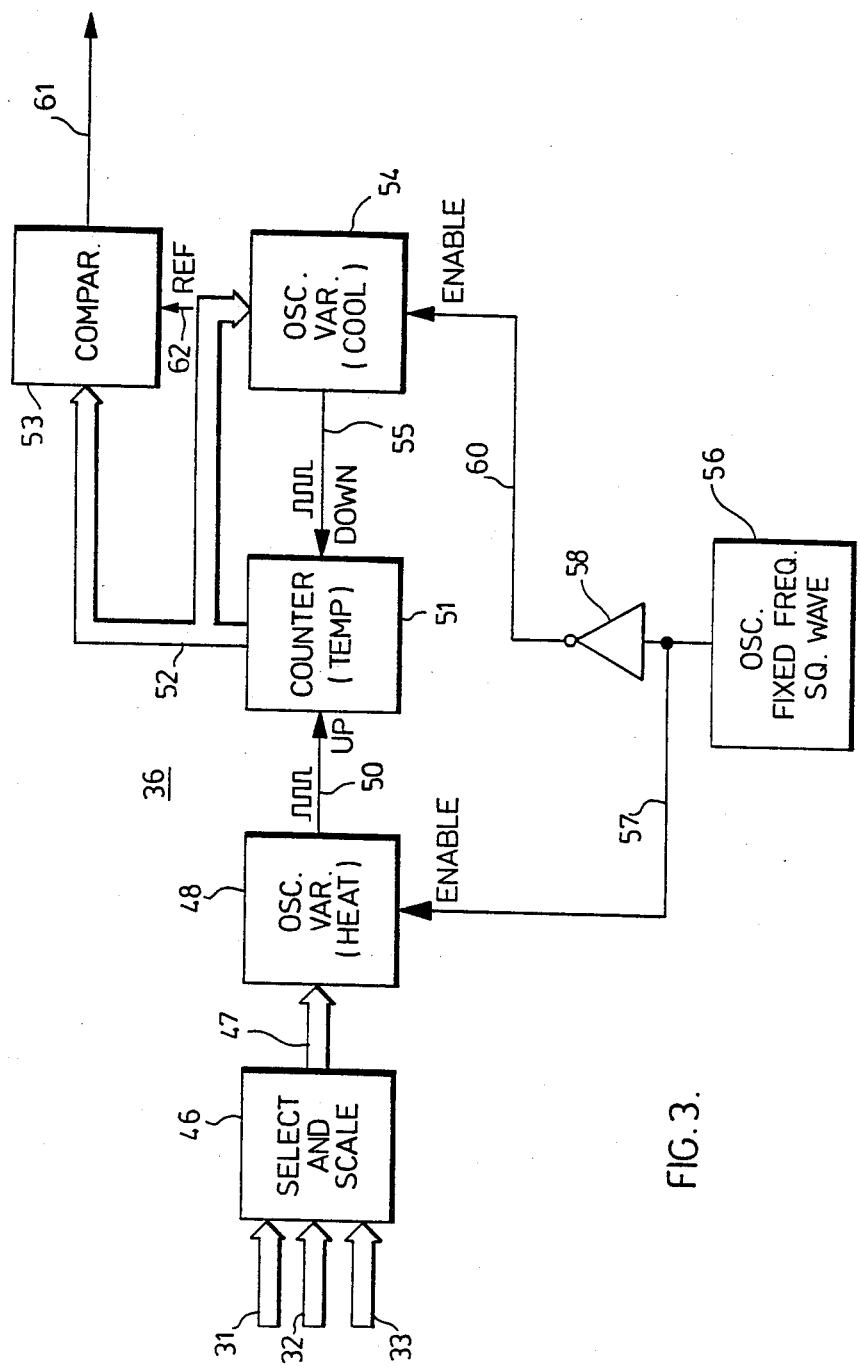
FIG. 3 is a simplified block schematic diagram of one form of motor thermal model suitable for use with the invention.

Referring to FIG. 1, there is shown a simplified block schematic diagram of one form of apparatus according to the present invention. Transformers 10, 11 and 12 couple current signals from respective first, second and third phases in a three phase power system supplying a motor. The current signals for the first, second and third phases are on conductors 14, 15 and 16 respectively and are derived from the secondary windings of transformers 10, 11 and 12. Conductors 14 and 15 are connected to zero crossing detectors 17 and 18 respectively. The zero crossing detectors 17 and 18 detect the zero crossing of the current signal which they receive and this identifies two of the phases as will be explained subsequently.

Diodes 20A, 20B and 20C are connected between a common point 21 and respective conductors 14, 15 and 16, and diodes 22A, 22B and 22C are respectively connected between conductors 14, 15 and 16 and a common point 23. As is apparent, these six diodes are connected to provide a full wave rectifier, and a composite waveform 24 (shown by solid line in FIG. 2) is available across a resistor 25; i.e., is available between points 21 and 23. It will, of course, be apparent that a half wave rectifier could be used.

The composite waveform 24 (FIG. 2) is derived from the rectified current waveforms of the three phases. The composite waveform is applied to analog-to-digital converter 26 from which a digital output is provided over bus 27 to a phase current reconstruction circuit 28. The phase current reconstruction circuit 28 also receives a signal over conductor 30 from zero crossing detector 18. The signal on conductor 30 represents the time that the current signal from one phase crosses a zero level or a reference level, and this signal enables phase current reconstruction circuit 28 to identify three phases. It is not necessary that the circuit 28 identify that the phase sequence is correct as this is done by another circuit. The phase current reconstruction circuit 28 identifies three phases and stores the peak levels of each phase. It provides on buses 31, 32 and 33 digital signals representing each of the three phases. The buses 31, 32 and 33 are each connected to phase loss detector 34, phase balance resolver 35 and motor thermal model 36.

Considering first the phase loss detector 34, it receives signals representing current in each of three phases. If any of the signals is lost, the phase loss detector provides a trip signal on conductor 37.

Phase balance resolver 35 receives the three signals representing phase current peaks. The phase balance resolver 35 can take many forms. In a simple form it determines the difference between the highest peak and the lowest peak and provides on bus 38 a digital signal representing the difference, and this difference signal is received by unbalance detector 40. Unbalance detector 40 compares the amount or degree of unbalance with a predetermined trip level. The predetermined trip level varies in accordance with the degree of unbalance and provides a delay which is related to the degree of unbalance; that is, the greater the unbalance, the shorter the delay. When a particular degree of unbalance has existed for a time period determined for that degree of unbalance, an unbalance trip signal is provided on conductor 41.

It should be noted that phase unbalance can give rise to rapid heating in that the unbalance causes a circulating current which is effectively at a frequency which is a multiple of line operating frequency and therefore causes more rapid heating.

Phase sequence detector 42 receives a signal on conductor 30 representing the zero crossing of the current signal of the phase from transformer 11. Similarly zero crossing detector 17 provides a signal on conductor 43 representing the zero crossing of the current signal from transformer 10, and this is also applied to phase sequence detector 42. Thus, phase sequence detector 42 receives signals representing the timing of two phases of a three phase supply. This is sufficient to determine the sequence of three phases. If the sequence should reverse, the phase sequence detector 42 provides a trip signal on conductor 44.

The motor thermal model 36 is a digital circuit which represents the thermal capacities and heat transfer properties of the motor components. The conductors for the three phases have a relatively low thermal capacity and they are a source of heat as they conduct current. It is preferable if the motor thermal model can represent the heating which occurs during starting and running. The heat from the conductors is transferred to the core material which has a larger thermal capacity and which is cooled by a ventilation system when it is running. A balance must be selected between the accuracy of the representation of the thermal model and the complexity of the thermal model. FIG. 3 shows a motor thermal model 36 which is of relatively simple design.

Referring to FIG. 3, the buses 31, 32 and 33 are connected to a select and scale circuit 46. This circuit selects the signal from the bus which has the highest signal; i.e., representing the largest current. It scales the signal appropriately and applies it over bus 47 to a variable oscillator 48. The variable oscillator 48 provides an output which varies in accordance with the signal on bus 47; that is, it increases in frequency with the increase in value of the signal on bus 47. The frequency of the oscillator is thus a representation of the rate at which heat is generated in the conductors. The output of oscillator 48 has a generally square waveform and, when the oscillator has an enable signal applied to it, its output is provided via conductor 50 to a counter 51. This signal on conductor 50 increases the count in counter 51, and the count in counter 51 represents temperature of the motor.

The output of counter 51, on bus 52, is applied to a comparator 53 and a variable oscillator 54. The variable oscillator 54 provides an output which varies in frequency in accordance with the signal on bus 52; that is, it increases in frequency with the value of the signal on bus 52. The frequency of oscillator 54 is thus a representation of the rate of cooling of the motor, which bears a relationship to the difference in temperature between the motor temperature and ambient or cooling medium temperature. The output of oscillator 54 has a generally square waveform and, when the oscillator has an enable signal applied to it, it provides an output via conductor 55 to counter 51. This signal decreases the count in counter 51.

Oscillator 56 is a fixed frequency oscillator (e.g., flip-flop) which has an evenly divided output; that is, its output is positive for the same length of time it is negative. The oscillator frequency should be low with respect to oscillators 48 and 54, perhaps of the range of one tenth at normal operating temperature. The output of oscillator 56 is applied over conductor 57 as an enable signal for oscillator 48. Conductor 57 is also connected to an inverter 58 which provides an enable signal on conductor 60 to oscillator 54. Thus oscillators 48 and 54 are enabled in turn to provide up and down counts respectively to counter 51.

The output of counter 51, which represents motor temperature, is applied via bus 52 to comparator 53 which compares the temperature signal to a predetermined critical reference temperature. This reference may be set in at input 62. When the temperature signal exceeds the reference, comparator 53 provides a trip signal on conductor 61.

The motor thermal model 36, as described with reference to FIG. 3, is a digital thermal model similar in principle to some aspects of the analog thermal model described in Canadian Pat. No. 983,094—Boothman et al., issued Feb. 3, 1976 to Canadian General Electric Company Limited. Also suitable for use as a thermal model is that shown and described in U.S. patent application Ser. No. 488,449 "Thermal Model for Electrical Apparatus" by D. R. Boothman et al., which application is assigned to the assignee of the present invention and was filed on even date herewith.

Referring again to FIG. 1, the motor thermal model 36 is shown with bus 52 connected to comparator or temperature detector 53 with the overtemperature trip signal available on conductor 61. Thus, there are four trip signals which can be generated and they are available on conductors 37, 41, 44 and 61.

Referring now to FIG. 4, there is shown a block diagram of one form of trip circuitry for the invention. The conductors 37, 41, 44 and 61 are shown connected to a trip logic circuit 63. These conductors will carry, respectively, trip signals representing unacceptable conditions of phase loss, phase unbalance, phase sequence reversal and motor overtemperature. The trip logic circuit 63, in response to receiving a trip signal on one of the conductors 37, 41, 44 and 61, provides a signal on conductor 64 to an annunciator indicating the fault, and provides a signal on conductor 65 to relay driver 66. Relay driver 66 energizes a relay trip coil 67 which opens breaker contacts to interrupt current to the motor. Normally closed and normally open contacts 70 and 71 are shown associated with the trip coil 67.

A trip condition signal is also provided on conductor 72 to a reset logic circuit 73. This trip signal acts as an inhibit signal to inhibit or lock the reset logic circuit so there can be no reset until the trip condition is cleared, that is, until the signal on conductor 37, 41, 44 or 61 which caused the trip is no longer present. When it is desired to initiate a reset, a reset signal is provided (normally by an operator) at input 74. If there is no inhibit signal on conductor 72, then reset logic circuit 73 provides a reset signal on conductor 75 to relay driver 76. Relay driver 76 energizes reset coil 77 which resets the breaker contacts.

Referring now to FIG. 5, there is shown an alternate form of the circuitry of FIG. 1 where components have been added to extend the operating range. Suppose, for example, the digital system for the arrangement shown in FIG. 1 is based on eight bits. This would provide a count of 256 and a step would be 1 in 256. If the system were expanded to a ten bit system, a count of 1024 could be provided and a step would be 1 in 1024. The arrangement of FIG. 5 uses an amplifier with a gain of four or a gain of unity to accomplish this without requiring expanded registers. That is, the use of the FIG. 5 arrangement provides most of the advantages of a ten bit system while requiring only an eight bit system.

In FIG. 5 the analog composite signal is shown on conductor 23' and is applied to amplifier 80. When the amplitude is low, the amplifier gain control is set to provide an amplification of four (i.e., two squared). The analog-to-digital converter 26' provides a corresponding signal in digital form to phase current reconstitution circuit 28' over bus 27' as was described in connection with FIG. 1. As the amplitude of the composite analog signal increases the corresponding digital representation becomes larger. At a specific predetermined value, the phase current reconstitution circuit 28' provides a signal on conductor 81 which adjusts the gain of amplifier 80 to unity. The phase current reconstitution circuit 28' makes a corresponding change so the operating range is effectively extended.

Figure 6:
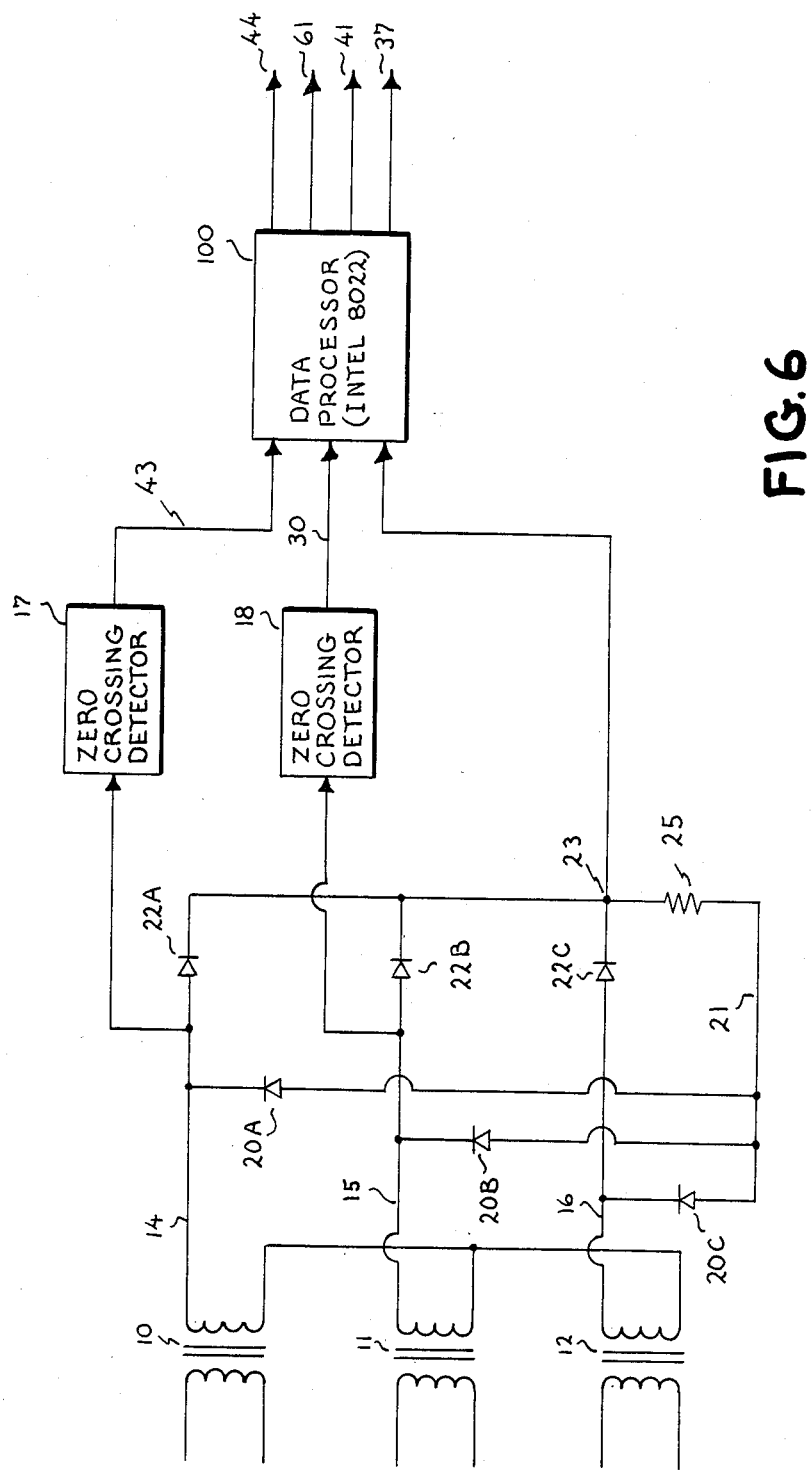

The showings of FIGS. 1 through 5 are believed to thoroughly describe the present invention and illustrate how the invention could be practiced using separate components. With present day technology, however, a more practical implementation of the instant invention can be achieved using a data processor. FIG. 6, taken in conjunction with the earlier referenced program as shown by the appended microfiche defines such an implementation. As seen in FIG. 6, the signals on lines 43 and 30 and at point 23 are derived in the same manner as described with respect to FIG. 1. However, in contrast to FIG. 1, rather than applying these several signals to individual functional blocks, these signals are applied to a suitable data processor 100 such as that sold by Intel Corporation under its 8022 designation; i.e., an Intel 8022 microprocessor. This processor, suitably programmed as by, for example, the appended program, performs the functions of the remaining portions of FIG. 1 the several output signals on lines 37, 41, 44 and 61 to be used in the manner as previously described.

While there have been shown and described what are at present considered to be the preferred embodiments of the present invention, modifications thereto will readily occur to those skilled in the art. For example, it will be apparent that the apparatus of the present invention will operate with poly-phase circuits other than three phase circuits, and that it can be used to protect electrical apparatus other than electric motors, for example, transformers. It is not desired, therefore, that the invention be limited to the specific arrangement shown and described, but it is intended to cover in the appended claims all such modifications as fall within the true spirit and scope of the invention.

What is claimed is:

1. Apparatus for protecting a three phase electrical equipment by interrupting the supply of power to said equipment in response to a determination of an unacceptable condition comprising:
   (a) sensor means for each phase for sensing the current in a respective phase of the supply of power to said equipment and for providing, for each phase, an analog signal representing current in the respective phase;
   (b) rectifier means connected to said sensor means for receiving the analog signals, said rectifier means having a common output across which there is provided a composite analog signal representing a composite of the current for each phase;
   (c) an analog-to-digital converter connected to said common output for receiving said composite analog signal and for providing a composite digital signal representing said composite analog signal;
   (d) a first detector connected to a first one of said sensor means for receiving an analog signal representing current in a respective phase of said supply and for providing a first time signal representing the time at which the current in the respective phase of said supply passes through a reference level;
   (e) a phase current reconstitution means connected to said analog-to-digital converter and to said first detector for receiving respectively said digital signal representing said composite analog signal and said first time signal and for providing, for each phase a digital signal representing the current values in the respective phase, said first time signal providing identification of said phase in normal sequence;
   a motor thermal model means connected to said phase current reconstitution means for receiving therefrom three digital signals representing the current in each phase, said motor thermal model means including selecting means for selecting the one of said three digital signals representing the largest current, said motor thermal model means determining from the said one of the three digital signals and from the duration thereof an equivalent motor temperature and providing a temperature signal representing said equivalent motor temperature, said thermal model comprising:
   (1) first and second variable frequency oscillators each having a first input for receiving a digital signal and a second input for receiving an enabling signal, each oscillator being responsive to the digital signal at its first input for varying its operating frequency and providing said operating frequency at an output thereof in response to an enabling signal at its second input,
   (2) said first oscillator having its first input connected to receive said selected one of said three digital signals representing the largest current,
   (3) a counter having a count up input and a count down input, the count up input being connected to said first oscillator and said count down input being connected to said second oscillator for receiving respective signals representing said respective operating frequencies, the output of said counter representing said equivalent motor temperature and,
   (4) signal generating means alternately providing enable signals to said second inputs of said first and second oscillators;
   (g) a temperature detector connected to said motor thermal model for receiving said temperature signal and comparing said temperature signal with a reference, said temperature detector providing an overtemperature tripping signal when said temperature signal exceeds said reference; and,
   (h) means responsive to said over-temperature tripping signal for interrupting the supply of power to said equipment.

* * * * *

UNITED STATES PATENT AND TRADEMARK OFFICE
CERTIFICATE OF CORRECTION

PATENT NO. : 4,544,982
DATED : Oct. 1, 1985
INVENTOR(S) : David R. Boothman and John C. Forde It is certified that error appears in the above-identified patent and that said Letters Patent are hereby corrected as shown below:

Page 1, after "Assignee:" delete "General Electric Company, Salem, Va." and substitute --Canadian General Electric Company, Limited, Toronto, Ontario, Canada--.

Signed and Sealed this

Twenty-sixth Day of August 1986

[SEAL]

Attest:

DONALD J. QUIGG

Attesting Officer

Commissioner of Patents and Trademarks